United States Patent Office 3,347,700
Patented Oct. 17, 1967

3,347,700
COATED CONTAINERS
Stewart W. Gloyer and Henry A. Vogel, Gibsonia, Pa., and Conrad L. Lynch, Wethersfield, Conn., assignors to Pittsburgh Plate Glass Company, Pittsburgh, Pa., a corporation of Pennsylvania
No Drawing. Filed June 30, 1964, Ser. No. 379,336
11 Claims. (Cl. 117—97)

This application is a continuation-in-part of application Ser. No. 65,938, filed Oct. 31, 1960, now abandoned.

This invention relates to metal containers having a resinous organic coating liner, and more particularly, this invention pertains to such containers lined with a coating composition comprising a modified unsaturated carboxylic acid amide interpolymer and a liquid butadiene polymer.

A number of useful interpolymers of unsaturated carboxylic acid amides, such as acrylamide or methacrylamide, are known and are disclosed, for example, in United States Patent Nos. 2,870,116, 2,870,117, 2,940,-945, 2,978,437 and 3,037,963. These interpolymers are generally produced by interpolymerizing an unsaturated carboxylic acid amide with at least one other polymerizable ethylenically unsaturated monomer, and then reacting the interpolymer with an aldehyde, such as formaldehyde, preferably in the presence of an alcohol, such as butanol. The resulting resins range from soft, flexible materials to very hard solids, depending upon the choice of monomers utilized in preparing the amide interpolymer which in turn is reacted with the aldehyde and optionally with the alcohol.

It has now been discovered that blends of these unsaturated carboxylic acid amide interpolymers with certain butadiene and modified butadiene resins form coating compositions which are extremely useful as coatings for sheet metal employed in the production of food and beverage containers.

The resultant blends under proper conditions cure extremely rapidly and can be employed to coat metals such as tin plate, black iron, terne plate, and aluminum, at such speeds as are desirable in fabrication of cans. The films, when properly cured upon metal, are very tough and will withstand fabrication operations. Furthermore, the coatings withstand the operations involved in sterilizing and processing prior to and during packing of the containers. The cured films, when the containers are packed, successfully withstand the action of many liquid and solid materials, such as beverages, detergents, fruit products, and the like; the films have good taste characteristics and scorch resistance. Advantageous properties are attained with very thin coatings, for example, having film weights as low as 2 milligrams per square inch or even lower.

Thus, the coating compositions described herein provide improved coatings for the internal surfaces of metal containers to be employed for packaging foods, beverages, detergents, and other comestibles and corrosive materials.

In the preparation of the modified amide interpolymers employed herein, a polymerizable unsaturated carboxylic acid amide is polymerized with one or more ethylenically unsaturated monomers, and the resulting interpolymer reacted with an aldehyde and an alcohol. The exact mechanism whereby the amide interpolymers are obtained is not definitely known, but is believed to begin by the formation initially of a relatively short chain soluble interpolymer, which then reacts with an aldehyde, such as formaldehyde, to replace amido hydrogen atoms with a methylol or other alkylol group. While it is believed that generally one hydrogen atom per amido group is replaced, it is possible to replace both, and such di-substituted amido groups are likely obtained in some proportion.

Further reaction of the alkylol group with an alcohol, as when the aldehyde is utilized in the form of a solution in butanol or other alkanol, results in etherification so that the interpolymer then has amido hydrogen atoms replaced by groups of the structure:

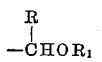

wherein R is hydrogen or a saturated lower aliphatic hydrocarbon radical having its free valences on a single carbon atom, depending upon the aldehyde employed, and $R_1$ is hydrogen in those unetherified groups and the radical derived by removing the hydroxyl groups from the alcohol in the etherified groups.

At least some of the alkylol groups should be etherified, e.g., at least 5 percent, and it is desirable that at least about 50 percent of these groups be etherified since compositions having less than about 50 percent of the alkylol groups etherified will tend to be unstable and subject to gelation. Butanol is the preferred alcohol for use in the etherification process, although any monohydric alcohol, such as methanol, ethanol, propanol, pentanol, octanol, decanol, and other alkanols containing up to about 20 carbon atoms, may also be employed, as may aromatic alcohols such as benzyl alcohol; or cyclic alcohols, such as cyclohexanol; or polyalkylene ether alcohols, such as the Cellosolves (ethylene glycol monobutyl ether and similar ethylene glycol monoalkylene ethers) and the Carbitols (diethylene glycol monoalkyl ethers, e.g., ethyl or butyl ethers).

While either acrylamide or methacrylamide is preferred for use in forming the interpolymer component, any unsaturated carboxylic acid amide can be employed. Such other amides include itaconic acid diamide, alpha-ethyl acrylamide, crotonamide, fumaric acid diamide, maelic acid diamide, and other amides of alpha, beta-ethylenically unsaturated carboxylic acids containing up to about 10 carbon atoms. Maleuric acid and esters thereof, and imide derivatives, such as N-carbamyl maleimide, may also be utilized.

At least one other unsaturated monomer is interpolymerized with the unsaturated carboxylic acid amide; any polymerizable ethylenically unsaturated monomer can be so utilized. Such monomers include monoolefinic and diolefinic hydrocarbons, halogenated monoolefinic and diolefinic hydrocarbons, unsaturated esters of organic and inorganic acids, esters of unsaturated acids, nitriles, unsaturated acids, and the like. The interpolymer compositions described in United States Patent No. 3,037,963 are excellent examples of the preferred type of amide polymers utilized in the instant invention, and the compounds disclosed therein illustrate the numerous monomers which can be interpolymerized along with the amide. Specific comonomers typically utilized include vinyl aromatic monomers such as styrene, alpha-methyl styrene, vinyl toluene, and mono and di-substituted chlorostyrenes; vinyl halides such as vinyl chloride; polyhaloethylenes such as vinylidene chloride; vinyl esters such as vinyl acetate, vinyl propionate, vinyl butyrate, and isopropenyl acetate; methyl methacrylate, ethyl acrylate, and other alkyl acrylates and methacrylates having 1 to 20 carbon atoms in the alkyl group; hydroxyalkyl esters such as hydroxyethyl acrylate, hydroxypropyl acrylate, hydroxyethyl methacrylate, and hydroxypropyl methacrylate; halogenated esters such as methyl alpha-chloroacrylate; unsaturated dicarboxylic acid esters such as dimethyl maleate, dibutyl maleate, dimethyl fumarate, and diethyl fumarate; organic nitriles such as acrylonitrile, methacrylonitrile, and crotonitrile; and acid monomers, such as acrylic acid, methacrylic acid, crotonic acid, 3-butenoic acid, itaconic acid, maleic acid, fumaric acid, butyl hydrogen maleate, methyl hydrogen fumarate, and other monoesters of maleic, fumaric, and similar acids.

It is to be understood that the above polymerizable olefinic monomers are representative only, and do not include all of the $CH_2=C<$ containing monomers which may be employed.

The preferred interpolymers for the present invention contain from 2 percent to 15 percent amide and at least about 30 percent of a vinyl aromatic monomer, preferably styrene, vinyl toluene or alpha-methyl styrene. There is generally included a minor proportion, e.g., 10 percent to 50 percent, of a lower alkyl ester of acrylic acid, such as ethyl acrylate, and a small proportion, e.g., 1 percent to 10 percent, of an acid monomer, preferably an acrylic acid, i.e., acrylic acid, methacrylic acid, or other substituted acrylic acid. These interpolymers when employed in the liner compositions herein provide the best combination of properties from the standpoint of hardness, resistance, compatibility, and cost.

In carrying out the polymerization reaction, there may be employed a peroxygen type catalyst, such as peroxides and hydroperoxides. For example, cumene hydroperoxide can be used advantageously at higher reflux temperatures, whereas benzoyl peroxide has been very effective at lower reflux temperatures. Peroxycarbonates, such as tertiary-butylperoxy isopropyl carbonate, are particularly effective catalysts, especially in difficult to contol polymerizations. Azo compounds, such as p-methoxyphenyl diazo-thio (2-naphthyl)ether and alpha, alpha'-azobis-(isobutyronitrile), may also be used as polymerization catalysts in the preparation of the amide interpolymers. Mixtures of catalysts and redox catalyst systems can also be employed.

The quantity of catalyst employed can be varied considerably; however, in most instances it is desirable to utilize from about 0.1 percent to 2.0 percent.

To obtain relatively low molecular weight interpolymers, the use of a lower alkanol such as butanol or a mixture of butanol and water as the solvent, together with high catalyst levels, aids considerably, but if desired there may be added controlled amounts of chain modifying materials. The mercaptans, such as tertiary-dodecyl mercaptan, and others such as cyclopentadiene, allyl acetate, allyl carbamate, alpha-methyl styrene, alpha-methyl styrene dimers, and the like, can be used for this purpose.

The polymerization is best carried out by admixing the amide and the other monomer or monomers with the catalyst and chain modifying agent, if any, in the solvent, and refluxing the resulting solution for a time sufficient to obtain the desired conversion. Ordinarily, the polymerization will be complete in about 1 to 16 hours. It may in some instances be desirable to add only a portion of the catalyst initially, the remainder being added in increments as the polymerization progresses.

As indicated above, the amide interpolymer resin is further reacted with an aldehyde, preferably in the presence of an alcohol. Formaldehyde, in solution in water (formalin) or in an alkanol such as butanol, or a formaldehyde-yielding substance such as paraformaldehyde, trioxymethylene, or hexamethylenetetramine is greatly preferred. However, other aldehydes, including acetaldehyde, butyraldehyde, furfural, and the like, preferably containing only atoms of carbon, hydrogen and oxygen, can be used.

It is ordinarily preferred to utilize two equivalents of formaldehyde for each amide group present in the interpolymer, although this amount may be in considerable excess of the amount necessary to form methylol groups on the polymer chain. Accordingly, this ratio may be raised or lowered considerably if desired. For example, the ratio may be as high as 3.0 equivalents of formaldehyde for each amide group in the interpolymer, or as low as about 0.2 equivalent of formaldehyde for each amide group in the interpolymer.

The reaction is preferably carried out in the presence of a mild acid catalyst, such as maleic anhydride. Other acid catalysts, such as oxalic acid, hydrochloric acid, or sulfuric acid, may also be employed, although there is some possibility of gelation occurring if the acid catalyst is too strongly acidic. The quantity of catalyst utilized may be varied widely; for example, as pointed out hereinabove, the more acidic the reaction medium, the greater amount of etherification will occur.

The reaction of the amide interpolymer with the aldehyde can be carried out simply by adding the aldehyde and the catalyst (if one is utilized) to the polymerization mixture obtained by polymerizing the amide and one or more ethylenically unsaturated monomers, and refluxing the resulting mixture for a period of from about 3 to about 5 hours until the desired vescosity is obtained. The water of condensation can be removed by azeotropic distillation, as may a portion of the solvent if desired.

Similar modified interpolymers may also be obtained by first reacting the amide with an aldehyde, such as formaldehyde, to obtain an alkylolamide, for example, a methylolamide, and then polymerizing the methylolamide with one or more of the ethylenically unsaturated monomeric materials disclosed hereinabove. The polymerization utilizing a methylolamide is carried out in substantially the same manner as when the amide is interpolymerized with one or more monomers. The interpolymer can then be reacted with an alcohol to effect etherification. Also, the modified interpolymer can be obtained by interpolymerizing an N-alkoxyalkyl amide, for example, N-butoxymethyl acrylamide, with one or more $CH_2=C<$ monomers, as described in United States Patent No. 3,079,-434. In still another method, all of the reactants, including the aldehyde and alcohol, can be admixed and the polymerization, alkylolation and etherification reactions carried out together.

The butadiene polymer which is blended with the aldehyde-modified unsaturated carboxylic acid amide resins according to the present invention can be any of the liquid butadiene polymers containing a major amount of butadiene, i.e., polybutadiene and copolymers of butadiene with a minor amount of a copolymerizable ethylenically unsaturated monomer, such as styrene, vinyl toluene, acrylonitrile, and the like. These butadiene oils may be prepared by a variety of polymerization procedures, one effective method being that disclosed in United States Patent No. 2,631,175. The sodium polymerized butadiene derived synthetic drying oils are especially contemplated for use in the present invention and may contain from 60 percent to 100 percent butadiene and 0 percent to 40 percent vinyl aromatic monomers, such as styrene or vinyl toluene. These copolymers have molecular weights between about 1,000 and 10,000, preferably about 2,000 to 5,000, and can be heat treated as disclosed in United States Patent No. 2,672,425, or blown in solvent. The oxygen content is between 6 percent and 22 percent, preferably 9 percent to 18 percent.

These butadiene polymers, however, are not by nature compatible with the modified amide interpolymers, and vary in compatibility depending upon their vinyl aromatic monomer content, and particularly the presence of a modifying agent containing carboxyl groups, such as maleic acid (or anhydride), or other polar groups that increase compatibility. United States Patent No. 2,652,342 discloses the preparation of the acid-modified butadiene-styrene copolymers; for example, from 0.01 part to 2.5 parts, and preferably from 0.05 part to 0.5 part, of maleic anhydride to 100 parts of butadiene polymer may be employed. Other acid modifiers may include fumaric acid, itaconic acid, acrylic acid, or methacrylic acid.

Certain of these modified and unmodified butadiene-styrene copolymers are obtained commercially under the trade name Buton, and are described by Koenecke and Van Nostrand in "Official Digest of the Federation of Societies of Paint Technology," June 1960, page 832. Buton 100 is an unmodified copolymer containing from about 75 percent to 85 percent butadiene and from 15 percent to 25 percent styrene; modification of this resin with maleic anhydride may be effected in the manner outlined in United States Patent No. 2,652,342. Buton 200 and Buton 300 are modified butadiene-styrene copolymers of the above composition which contain polar groups (carboxyl and hydroxyl).

The following table gives the properties of the Buton resins:

TABLE I

| Properties | Buton 100 | Buton 200 | Buton 300 |
|---|---|---|---|
| Nonvolatile content, percent | 100 | [1] 50 | [2] 45 |
| Weight per gallon, pounds-solids | 7.65 | 8.08 | 8.33 |
| Viscosity, Gardner-Holdt | C-E | G-J | J-N |
| Color, Gardner | 1 | 7 | 10 |
| Acid value | 0 | 20 | 30 |
| Hydroxyl value | 0 | 100 | 150 |
| Iodine value | 330 | 270 | 210 |

[1] Solvent composition: 75 percent aromatic naphtha (Solvesso 100) and 25 percent isopropanol.
[2] Solvent composition: 67 percent Solvesso 100 and 33 percent isopropanol.

Another advantageous liquid butadiene polymer for use herein is epoxidized polybutadiene. The material known commercially as Oxiron 2000 is an example. With epoxidized polybutadiene it is desirable to employ an acid-containing amide interpolymer, such as those disclosed in United States Patent No. 2,978,437, or to employ interpolymers containing a hydroxyalkyl monomer, such as hydroxyethyl methacrylate.

Still other liquid butadiene polymers include the polybutadienes, for instance, those known as Butarez polybutadienes. Typical properties of these include a molecular weight of about 1500, 2500 to 5000 centipoises viscosity at 100° F., and iodine value of 365 to 385.

It is, of course, desirable that the butadiene polymer be compatible with the amide interpolymer in the proportions desired. However, in certain instances useful compositions can also be obtained by blending these interpolymers with liquid butadiene polymers that are not completely compatible therewith.

Since compatibility is not always critical, the proportions of the amide interpolymer and the butadiene polymer may vary from about 5 percent to 95 percent of the butadiene polymer to about 95 percent to 5 percent of the interpolymer; however, it is preferred that the polybutadiene be the minor component (present in an amount less than 50 percent).

The formulation of the blends of the invention vary considerably depending upon the nature of each resin. For example, they may be prepared simply by incorporating the resinous components in a suitable solvent system by agitation, or each resinous component may be dissolved in a solvent and resulting solutions combined to form the finished coating composition. In some of the more compatible blends, mixing such as in a Banbury mixer or other similar device may be used without the aid of solution; heating is usually required to expedite the blending where no solvent is used.

The following exemplify the preparation of amide interpolymers as employed herein. All parts and percentages are given by weight unless otherwise specified.

INTERPOLYMER A

Fifteen (15) parts of acrylamide and 85 parts of vinyl toluene were admixed with a solvent comprising 46.5 parts of butanol and 46.5 parts of toluene, and containing 1 part cumene hydroperoxide and 1 part tertiary-dodecyl mercaptan. This mixture was then refluxed for two 2-hour periods, after each of which was added 0.5 part of cumene hydroperoxide. After the last reflux period, 31.5 parts of 40 percent formaldehyde solution in butanol (butyl Formcel) and 0.25 part of maleic anhydride were added with the cumene hydroperoxide, and the mixture was azeotropically distilled for 3 hours to remove the formed water. The resinous product was filtered and cooled. Its solids content was about 50 percent and its Gardner-Holdt viscosity was X–Z.

INTERPOLYMER B

An acrylamide interpolymer was prepared from the following mixture:

| | Parts by weight |
|---|---|
| Acrylamide | 90 |
| Styrene | 231 |
| Ethyl acrylate | 264 |
| Methacrylic acid | 15 |
| n-Butanol | 300 |
| Toluene | 300 |

The above components were refluxed in the presence of 9 parts of cumene hydroperoxide and 9 parts of tertiary-dodecyl mercaptan for 2 hours at 210° C. to 215° C., after which were added 3 parts of cumene hydroperoxide. The mixture was then refluxed for three successive 2-hour periods, after each of which was added 3 parts of cumene hydroperoxide. After the second reflux period, 190.5 parts of a 40 percent solution of formaldehyde in butanol (butyl Formcel) and 2.6 parts of maleic anhydride were also added. During the last two reflux periods, the formed water was removed by azeotropic distillation. The resulting resinous product had a solids content of 50 percent and a viscosity of U–W (Gardner-Holdt).

INTERPOLYMER C

Two hundred six and three-tenths (206.3) parts of styrene, 37.5 parts of acrylamide, and 6.25 parts of methacrylic acid were admixed with 2.5 parts of tertiary-dodecyl mercaptan, 125 parts of butanol, 125 parts of toluene and 2.5 parts of cumene hydroperoxide. The resulting mixture was refluxed for 2 hours, after which an additional 1.25 parts of cumene hydroperoxide were added. Refluxing was then continued for a further period of 2 hours, at which time a final addition of 1.25 parts of cumene hydroperoxide was made and refluxing continued until a conversion of substantially 100 percent was obtained. The resulting product was then admixed with 79.4 parts of a 40 percent solution of formaldehyde in butanol and 1 part of maleic anhydride catalyst. The resulting mixture was then refluxed under azeotropic conditions for 3 hours to remove water of reaction. The resinous product had a solids content of about 50 percent and a Gardner-Holdt viscosity of V–Y.

Set forth below are several examples of the invention.

*Example 1*

A coating composition was produced by blending the following thoroughly and homogeneously:

| | Parts by weight |
|---|---|
| Interpolymer A (50 percent solids) | 25 |
| Buton 200 (50 percent solids) | 75 |
| n-Butanol | 10 |

The above solution was drawn down on electrolytic tin plate and baked at 400° F. for 10 minutes. The resulting clear film was boiled in water for 30 minutes. The coating had very good adhesion and fabrication.

*Example 2*

A coating composition was made by blending the following:

| | Parts by weight |
|---|---|
| Interpolymer B | 320 |
| Buton 300 (45 percent solids) | 355 |
| Solvent (Solvesso 150) (high boiling aromatic hydrocarbon) | 175 |

The above composition was drawn down on tin plate using an 0.014 wire wound bar and cured at 400° F. for 10 minutes. A can was fabricated thereafter from the coated tin plate and filled with a meat-containing substance and sealed.

The above coating composition had very good adhesion and fabrication properties. There was also a very minimum of sulfide spangling from reaction of migrating sulfur-containing compounds from the meat substance with the tin of the container.

*Example 3*

A coating composition was made by blending the following:

| | Parts by weight |
|---|---|
| Interpolymer B (50 percent solids) | 15 |
| Buton 200 (50 percent solids) | 45 |
| Solvent (Solvesso 100) (aromatic, boiling point 150° C. to 170° C.) | 25 |

The above solution had a viscosity of 44 seconds (No. 4 Ford Cup).

The above composition was drawn down on electrolytic tin plate and air dried for 5 seconds, and then cured at 400° F. for 10 minutes. The resulting film was clear and adherent with no cracks or crazing.

The following blends which are set forth in the following table of examples were drawn down on 85-pound electrolytic tin plate with an 0.022 draw bar. The coated tin plate thus prepared was fabricated into a can which was subjected to water process treatment for 90 minutes at 250° F., in which the coated tin plate is kept in water under pressure in a closed vessel. The samples were then subjected to acidic copper sulfate for 5 minutes. If the fabricating has cracked the coating, there will be an electrolytic exchange of the metal of the can for the copper combined as copper sulfate; the free copper is plated on the cracked areas. The amount of deposited copper is used as a measure of cracking, which in turn is an indication of flexibility and ability to withstand fabrication. The samples were then also tested for adhesion as follows:

The baked coating is first scored with a knife edge and the score is then covered wtih Scotch tape which is removed. The area proximate to the score is then examined to determine the amount of coating material which is removed with Scotch tape. The amount of coating material which comes off with the Scotch tape is indicative of the adhesion.

with an adduct of a hydroxyl-containing polymer with a dicarboxylic acid anhydride, are also contemplated for the present invention.

According to the provisions of the patent statutes, there are described above the invention and what are now considered to be its best embodiments. However, within the scope of the appended claims, it is to be understood that the invention can be practiced otherwise than as specifically described.

We claim:

1. A metal container having its internal surface coated with an adherent layer of a coating composition in which the film-forming component consists essentially of (1) a liquid butadiene polymer containing a major proportion of butadiene in polymerized form, and (2) a water-insoluble, ungelled interpolymer of an ethylenically unsaturated carboxylic acid amide and at least one other monomer having a $CH_2=C<$ group, said interpolymer being characterized by having amido hydrogen atoms replaced by the structure:

$$-\overset{R}{\underset{|}{C}}HOR_1$$

where R is selected from the group consisting of hydrogen and a saturated lower aliphatic hydrocarbon radical having its free valences on a single carbon atom, and $R_1$ is a radical derived by removing the hydroxyl group from a monohydric alcohol.

2. The container of claim 1 in which the liquid butadiene polymer component of said composition contains from 60 percent to 100 percent by weight of butadiene and from 0 percent to 40 percent by weight of a vinyl aromatic monomer.

3. The container of claim 1 in which the modified interpolymer component of said composition has at least about 50 percent of the amido groups thereof with at least one hydrogen atom replaced by the said structure.

4. A metal container having its internal surface coated with an adherent layer of a coating composition in which the film-forming component consists essentially of (1) a liquid butadiene polymer containing a major proportion of butadiene in polymerized form, said polymer containing polar hydroxyl and carboxyl groups along the polymer chain, and (2) a water-insoluble, ungelled interpolymer of an ethylenically unsaturated carboxylic acid amide and

TABLE II

| Example No. | Interpolymer Parts by Weight | Butadiene Polymer Parts by Weight | Time and Temperature of Cure | | Appearance of Film | Solvent Parts by Weight | Remarks |
|---|---|---|---|---|---|---|---|
| | | | Minutes | °F. | | | |
| 4 | 12.5 parts of Interpolymer C. | 37.5 parts of Buton 200. | 10 | 400 | Clear | 25 parts of cyclohexanone | The coating had good fabrication and excellent adhesion. |
| 5 | 12.5 parts of Interpolymer B. | do | 10 | 400 | do | 25 parts of pine oil, boiling point 180° C. to 230° C. | Do. |
| 6 | do | 33.3 parts of Buton 300. | 10 | 400 | do | 16.7 parts of dimethyl formamide. | Do. |

Obviously, a great many other modified amide interpolymers may be utilized in place of those specified in the examples, for example, those of the patents mentioned above. Similarly, other butadiene polymers, such as those disclosed above, may be substituted for the butadiene polymers of the examples.

The coating compositions themselves may be made using almost any pigment or may contain other materials, such as the ester gums, to impart color thereto.

It is also possible to include in the coating compositions of this invention additive amounts of other resinous materials, such as vinyl resins, alkyd resins, amine resins, phenolic resins, polyacrylate resins, and the like. Epoxy resins (polyepoxides) such as Epon 1000 and other bisphenol A epichlorohydrin condensation products are especially useful in certain applications. Low temperature cure blends of the aldehyde-modified amide interpolymer at least one other monomer having a $CH_2=C<$ group, said interpolymer being characterized by having at least some of the amido hydrogen atoms replaced by the structure:

$$-CH_2OR_1$$

where $R_1$ is a radical derived by removing the hydroxyl group from a monohydric alcohol.

5. A metal container having its internal surface coated with an adherent layer of a coating composition in which the film-forming component consists essentially of (1) a liquid butadiene polymer containing a major proportion of butadiene in polymerized form, and (2) a water-insoluble, ungelled interpolymer containing from about 2 percent to about 15 percent by weight of an ethylenically unsaturated carboxylic acid amide and a major proportion of a vinyl aromatic monomer, said interpolymer being characterized by having amido hydrogen atoms replaced by the structure:

$$-\overset{R}{\underset{}{C}}HOR_1$$

where R is selected from the group consisting of hydrogen and a saturated lower aliphatic hydrocarbon radical having its free valences on a single carbon atom, and $R_1$ is a radical derived by removing the hydroxyl group from a monohydirc alcohol.

6. The container of claim 5 in which the interpolymer component of said composition contains a minor proportion of a lower alkyl ester of acrylic acid.

7. The container of claim 5 in which the butadiene polymer component of said composition contains from 60 percent to 100 percent by weight of butadiene and from 0 percent to 40 percent by weight of a vinyl aromatic monomer.

8. A metal container having its internal surface coated with an adherent layer of a coating composition in which the film-forming component consists essentially of (1) a liquid butadiene polymer containing a major proportion of butadiene in polymerized form and having polar hydroxyl and carboxyl groups along the polymer chain, and (2) a water-insoluble, ungelled interpolymer of from about 2 percent to about 15 percent acrylamide and at least about 30 percent of a vinyl aromatic monomer, said interpolymer being characterized by having at least about 50 percent of the amido groups thereof with at least one hydrogen atom replaced by the structure:

$$-CH_2OR_1$$

where $R_1$ is a lower alkyl radical.

9. The container of claim 8 in which the interpolymer component of said composition is characterized by groups of the said structure in which $R_1$ is butyl.

10. The container of claim 8 in which the interpolymer component of said composition contains from about 10 percent to about 50 percent of a lower alkyl ester of acrylic acid and from about 1 percent to about 10 percent of an acrylic acid.

11. The container of claim 8 in which the interpolymer component of said composition is an interpolymer of acrylamide, styrene, ethyl acrylate, and methacrylic acid.

References Cited

UNITED STATES PATENTS

| | | | |
|---|---|---|---|
| 2,768,908 | 10/1956 | Cull | 117—97 |
| 2,870,116 | 1/1959 | Vogel et al. | 260—850 |
| 2,940,945 | 6/1960 | Christenson et al. | 260—850 |
| 3,037,963 | 6/1962 | Christenson et al. | 260—873 |
| 3,117,693 | 1/1964 | Vogel | 117—97 |

ALFRED L. LEAVITT, *Primary Examiner.*

A. H. ROSENSTEIN, *Assistant Examiner.*